United States Patent
Xue et al.

(10) Patent No.: US 11,032,105 B2
(45) Date of Patent: Jun. 8, 2021

(54) METHOD FOR IMPLEMENTING GRE TUNNEL, HOME GATEWAY AND AGGREGATION GATEWAY

(71) Applicant: HUAWEI TECHNOLOGIES CO., LTD., Guangdong (CN)

(72) Inventors: Li Xue, Shenzhen (CN); Jinfeng Zhang, Shenzhen (CN); Haibo Zhang, Beijing (CN); Jianzheng Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/233,475

(22) Filed: Dec. 27, 2018

(65) Prior Publication Data

US 2019/0132151 A1 May 2, 2019

Related U.S. Application Data

(63) Continuation of application No. 14/992,206, filed on Jan. 11, 2016, now Pat. No. 10,212,004, which is a
(Continued)

(51) Int. Cl.
*H04L 12/46* (2006.01)
*H04L 12/24* (2006.01)
(Continued)

(52) U.S. Cl.
CPC .......... *H04L 12/4633* (2013.01); *H04L 12/66* (2013.01); *H04L 41/0803* (2013.01); *H04L 45/74* (2013.01)

(58) Field of Classification Search
None
See application file for complete search history.

(56) References Cited

U.S. PATENT DOCUMENTS 6,754,221 B1 * 6/2004 Whitcher ............... H04L 47/10
370/401
6,982,984 B1 1/2006 Asayesh et al.
(Continued)

FOREIGN PATENT DOCUMENTS

CN 1398090 A 2/2003
CN 101119272 A 2/2008
(Continued)

OTHER PUBLICATIONS

CISCO. Implementing Tunnels. 2007 (Year: 2007).*
(Continued)

*Primary Examiner* — Andre Tacdiran

(57) ABSTRACT

In a method for implementing a GRE tunnel, an access device obtains an address of an aggregation gateway group including at least one aggregation gateway. The access device sends a tunnel setup request to the aggregation gateway for setting up a GRE tunnel, and the request contains an address of the access device encapsulated by using the address of the aggregation gateway group as a destination address. The access device receives a tunnel setup accept response sent back by an aggregation gateway and obtains an address of the aggregation gateway from the response. The aggregation gateway belongs to the aggregation gateway group. The access device configures the address of the aggregation gateway as a network side destination address of the GRE tunnel.

12 Claims, 6 Drawing Sheets

Related U.S. Application Data continuation of application No. PCT/CN2013/079322, filed on Jul. 12, 2013.

(51) Int. Cl.
*H04L 12/66* (2006.01)
*H04L 12/741* (2013.01)

(56) References Cited

U.S. PATENT DOCUMENTS

| | | | |
|---|---|---|---|
| 7,136,384 B1 | 11/2006 | Wang | |
| 7,356,031 B1 | 4/2008 | Toebes et al. | |
| 7,797,426 B1 | 9/2010 | Lyon | |
| 7,830,787 B1 | 11/2010 | Wijnands et al. | |
| 8,184,644 B1 * | 5/2012 | Chen | H04W 92/12 370/401 |
| 8,279,752 B1 * | 10/2012 | Busch | H04L 12/4633 370/228 |
| 8,595,846 B1 | 11/2013 | Etheredge et al. | |
| 8,976,649 B2 | 3/2015 | Li et al. | |
| 9,313,687 B2 | 4/2016 | Knutson | |
| 9,344,421 B1 | 5/2016 | Chen et al. | |
| 9,350,706 B1 | 5/2016 | Smith et al. | |
| 9,450,817 B1 | 9/2016 | Bahadur et al. | |
| 2003/0158967 A1 | 8/2003 | Tripathi et al. | |
| 2004/0013118 A1 | 1/2004 | Borella | |
| 2004/0066769 A1 | 4/2004 | Ahmavaara et al. | |
| 2004/0085951 A1 | 5/2004 | Rezaiifar et al. | |
| 2004/0223497 A1 * | 11/2004 | Sanderson | H04L 12/4641 370/395.52 |
| 2005/0080884 A1 | 4/2005 | Siorpaes et al. | |
| 2005/0089008 A1 | 4/2005 | Choo et al. | |
| 2005/0220069 A1 | 10/2005 | Li et al. | |
| 2005/0270992 A1 * | 12/2005 | Sanzgiri | H04L 63/08 370/310.2 |
| 2006/0015590 A1 | 1/2006 | Patil et al. | |
| 2006/0143702 A1 | 6/2006 | Hisada et al. | |
| 2006/0198345 A1 | 9/2006 | Chen | |
| 2006/0200543 A1 | 9/2006 | Kong et al. | |
| 2006/0245408 A1 | 11/2006 | Lee et al. | |
| 2006/0251101 A1 | 11/2006 | Zhang et al. | |
| 2007/0081469 A1 * | 4/2007 | Tracy | H04W 24/02 370/252 |
| 2007/0147372 A1 | 6/2007 | Liu et al. | |
| 2007/0254661 A1 | 11/2007 | Chowdhury et al. | |
| 2007/0276905 A1 | 11/2007 | Durand et al. | |
| 2007/0283429 A1 | 12/2007 | Chen et al. | |
| 2008/0144627 A1 | 6/2008 | Ballantyne et al. | |
| 2008/0281978 A1 | 11/2008 | Tang et al. | |
| 2009/0003208 A1 | 1/2009 | Payyappilly et al. | |
| 2009/0003313 A1 * | 1/2009 | Busch | H04L 12/4633 370/352 |
| 2009/0046577 A1 | 2/2009 | Marin | |
| 2009/0073935 A1 * | 3/2009 | Xia | H04W 12/04 370/331 |
| 2009/0303973 A1 | 12/2009 | Patil | |
| 2009/0310551 A1 | 12/2009 | Hellgren et al. | |
| 2010/0067462 A1 * | 3/2010 | Beser | H04L 45/00 370/329 |
| 2010/0142410 A1 | 6/2010 | Huynh Van et al. | |
| 2010/0238791 A1 | 9/2010 | Duncan et al. | |
| 2010/0238805 A1 * | 9/2010 | Ludwig | H04W 28/0268 370/236 |
| 2010/0246829 A1 | 9/2010 | McGrew et al. | |
| 2010/0302989 A1 | 12/2010 | Sung et al. | |
| 2011/0004913 A1 | 1/2011 | Nagarajan et al. | |
| 2011/0038380 A1 | 2/2011 | Li et al. | |
| 2011/0044690 A1 | 2/2011 | Al-Kadi et al. | |
| 2011/0069701 A1 | 3/2011 | Wu | |
| 2011/0110328 A1 | 5/2011 | Pradeep et al. | |
| 2011/0122824 A1 | 5/2011 | Muhanna et al. | |
| 2011/0131645 A1 | 6/2011 | Johnson et al. | |
| 2011/0274108 A1 | 11/2011 | Fan | |
| 2011/0286396 A1 | 11/2011 | Kato et al. | |
| 2012/0033663 A1 | 2/2012 | Guichard et al. | |
| 2012/0063450 A1 | 3/2012 | Pignataro et al. | |
| 2012/0099561 A1 | 4/2012 | Zhao et al. | |
| 2012/0099602 A1 | 4/2012 | Nagapudi et al. | |
| 2012/0281708 A1 | 11/2012 | Chauhan et al. | |
| 2012/0294277 A1 | 11/2012 | Jaiswal et al. | |
| 2013/0044636 A1 | 2/2013 | Koponen et al. | |
| 2013/0054761 A1 * | 2/2013 | Kempf | H04L 47/781 709/220 |
| 2013/0250951 A1 | 9/2013 | Koganti | |
| 2013/0254264 A1 | 9/2013 | Hankinson et al. | |
| 2013/0315125 A1 | 11/2013 | Ravishankar et al. | |
| 2014/0010234 A1 | 1/2014 | Patel et al. | |
| 2014/0052860 A1 | 2/2014 | Duggal et al. | |
| 2014/0056290 A1 | 2/2014 | Pazhyannur et al. | |
| 2014/0105031 A1 | 4/2014 | McDysan et al. | |
| 2014/0105216 A1 | 4/2014 | McDysan | |
| 2014/0157042 A1 | 6/2014 | Johnson et al. | |
| 2014/0164617 A1 | 6/2014 | Jalan et al. | |
| 2014/0192810 A1 * | 7/2014 | Hikichi | H04L 45/126 370/392 |
| 2014/0241247 A1 * | 8/2014 | Kempf | H04L 12/4641 370/328 |
| 2014/0317276 A1 * | 10/2014 | Tie | H04L 45/306 709/224 |
| 2014/0321277 A1 | 10/2014 | Lynn, Jr. et al. | |
| 2014/0376550 A1 | 12/2014 | Khan et al. | |
| 2015/0010003 A1 * | 1/2015 | Song | H04L 45/745 370/392 |
| 2015/0023352 A1 | 1/2015 | Yang et al. | |
| 2015/0098472 A1 | 4/2015 | Choi et al. | |
| 2015/0201447 A1 | 7/2015 | Li et al. | |
| 2015/0215810 A1 * | 7/2015 | Andreasen | H04W 28/0226 370/254 |
| 2015/0288443 A1 | 10/2015 | Foxworthy et al. | |
| 2015/0334024 A1 * | 11/2015 | Mogul | H04L 47/263 370/237 |
| 2015/0334633 A1 | 11/2015 | Zhou et al. | |
| 2016/0127149 A1 | 5/2016 | Xue et al. | |

FOREIGN PATENT DOCUMENTS

| | | |
|---|---|---|
| CN | 101133598 A | 2/2008 |
| CN | 101207546 A | 6/2008 |
| CN | 101572644 A | 11/2009 |
| CN | 101572664 A | 11/2009 |
| CN | 101645895 A | 2/2010 |
| CN | 102025613 A | 4/2011 |
| CN | 102065471 A | 5/2011 |
| CN | 102868586 A | 1/2013 |
| CN | 103188760 A | 7/2013 |
| CN | 105264835 B | 12/2016 |
| EP | 2071766 A1 | 6/2009 |

OTHER PUBLICATIONS

XP015094477. Xue D Guo Huawei L: "Dynamic Stateless GRE tunnel; draft_xue_dhc-dynamic-gre-00.txt", Jul. 9, 2013, total 10 pages.

S. Hanks et al, Generic Routing Encapsulation (GRE). RFC1701, Oct. 1994, 8 pages.

D. Farinacci et al, Generic Routing Encapsulation (GRE). RFC2784, Mar. 2000, 9 pages.

P. Calhoun, Ed. et al, Control and Provisioning of Wireless Access Points (CAPWAP) Protocol Specification. RFC5415, Mar. 2009, 155 pages.

\* cited by examiner

METHOD FOR IMPLEMENTING GRE TUNNEL, HOME GATEWAY AND AGGREGATION GATEWAY

CROSS-REFERENCE TO RELATED APPLICATIONS

This application is a continuation of U.S. patent application Ser. No. 14,992/206, filed on Jan. 11, 2016. The U.S. patent application Ser. No. 14,992/206 is a continuation of International Application No. PCT/CN2013/079322, filed on Jul. 12, 2013. All of the aforementioned patent applications are hereby incorporated by reference in their entireties

TECHNICAL FIELD

Embodiments of the present invention relate to communications technologies, and in particular, to a method for implementing a GRE tunnel, an access device, and an aggregation gateway.

BACKGROUND

In actual network transmission, an operator usually implements service transmission for a user by configuring a tunnel, such as a virtual local area network (Virtual Local Area Network, VLAN for short) tunnel, and a pseudo wire (Pseudo Wire, PW for short) tunnel. However, to configure these tunnels, a network and a network device must meet certain functional requirements. For example, when a PW tunnel is configured, both a provider edge (Provider Edge, PE for short) device and a provider (Provider, P for short) device on a network need to support label forwarding. Whereas a generic routing encapsulation (Generic Routing Encapsulation, GRE for short) tunnel is a simple data tunnel, in which configurations of the tunnel can be ensured only when the PE device of the tunnel is ensured. Therefore, the GRE technology receives extensive attention from equipment providers and operators.

On a wireless local access network (Wireless Local Access Network, WLAN for short), the GRE tunnel is especially useful. Generally, a WLAN network architecture includes an access point (Access Point, AP for short), an access controller (Access Controller, AC for short), and a gateway (Gateway, GW for short). The AP is a network element that is deployed on a side of a terminal and is accessed by the terminal. For example, a wireless fidelity (Wireless Fidelity, WiFi for short) hot spot is an AP. The AC is configured to control an access network element, for example, configuration of AP information. The AC may be deployed in a data transmission path and is responsible for routing and forwarding, and may also be connected only to the GW and be responsible for access control. The GW, also referred to as a WLAN GW, is a WLAN gateway device and is responsible for managing a WLAN user. The WLAN GW includes functions of a broadband remote access server (Broadband Remote Access Server, BRAS for short)/a broadband network gateway (Broadband Network Gateway, BNG for short) on an operator's network. It is a tendency in the future that a single WLAN GW is deployed to complete various management on the WLAN user, including billing, policy, quality of service (Quality of Service, QoS for short), and the like.

In addition to the foregoing scenarios, the operator, especially the fixed network operator, faces a bandwidth bottleneck during development. The uplink bandwidth of a broadband home gateway in a last mile is difficult to improve due to constraints of physical cables; costs for re-laying out the cables are high. The operator hopes to bind other links or links of other networks and use a network path on which multiple accesses coexist to improve broadband services over a fixed network. Therefore, the operator hopes to introduce an aggregation technology of homogeneous or heterogeneous access networks to an access network to improve network bandwidth.

A home gateway (Home Gateway, HG for short), as a network access device, can increase access bandwidth for a user by binding a plurality of links. In the case of aggregation of multiple access networks, it should be ensured that a technology that implements efficient tunnel transmission between the access device HG and an aggregation gateway (Aggregation Gateway, AG for short) is provided. During actual deployment of a network, the operator hopes to set up a tunnel based on the homogeneous or heterogeneous access network over a Layer 3 network, and to increase bandwidth utilization. To meet this requirement and to reduce requirements for a transmission network, many access device providers and operators are all in favor of a GRE transmission technology.

However, in an existing GRE tunnel, it is necessary to configure addresses of a source node and a destination node as the destination addresses of the tunnel on the source node and the destination node of the GRE tunnel, that is, to implement static configuration of the GRE tunnel. However, this is not applicable to a situation in which a variety of access networks are aggregated and a plurality of IP addresses exist in the access device or the AG. If the IP addresses are still statically configured, obviously, an advantage of an aggregation technology that dynamically selects the access network to make use of network resources cannot be brought into full play.

SUMMARY

Embodiments of the present invention provide a method for implementing a GRE tunnel, an access device, and an aggregation gateway, to dynamically set up a GRE tunnel on an access network that uses an aggregation technology. An embodiment of the present invention provides a method for implementing a GRE tunnel. An access device obtains an address of an aggregation gateway group. The aggregation gateway group includes at least one aggregation gateway. The access device sends a GRE tunnel setup request by using the address of the aggregation gateway group as a destination address. An address of the access device is encapsulated in the GRE tunnel setup request. The GRE tunnel setup request is used to request for setting up a GRE tunnel. The access device receives a GRE tunnel setup accept response sent back by an aggregation gateway and obtains an address of the aggregation gateway from the GRE tunnel setup accept response. The aggregation gateway belongs to the aggregation gateway group. The access device configures the address of the aggregation gateway as a network side destination address of the GRE tunnel.

An embodiment of the present invention provides a method for implementing a GRE tunnel performed by an aggregation gateway. The aggregation gateway receives a GRE tunnel setup request sent by an access device. The GRE tunnel setup request is used to request for setting up a GRE tunnel. A source address of the GRE tunnel setup request is an address of the access device. A destination address of the GRE tunnel setup request is an address of an aggregation gateway group. The aggregation gateway belongs to the aggregation gateway group. The aggregation gateway determines to accept the GRE tunnel setup request and obtains the address of the access device from the GRE tunnel setup request. The aggregation gateway configures the address of the access device as an access side destination address of the GRE tunnel and sends a GRE tunnel setup accept response by using the address of the access device as a destination address. An address of the aggregation gateway is encapsulated in the GRE tunnel setup accept response. The GRE tunnel setup accept response is used to indicate that the access device configures the address of the aggregation gateway as a network side destination address of the GRE tunnel.

An embodiment of the present invention provides an access device. The access device includes a transmitter, a receiver, a memory and a processor separately connected to the transmitter, the receiver and the memory. The memory stores program code, which when executed by the processor causes the access device to perform the following operations:

obtaining an address of an aggregation gateway group, wherein the aggregation gateway group comprises at least one aggregation gateway;

sending by using the address of the aggregation gateway group as a destination address, a GRE tunnel setup request in which an address of the access device is encapsulated, wherein the GRE tunnel setup request is used to request for setting up a GRE tunnel;

receiving a GRE tunnel setup accept response sent back by an aggregation gateway, and obtaining an address of the aggregation gateway from the GRE tunnel setup accept response, wherein the aggregation gateway belongs to the aggregation gateway group; and configuring the address of the aggregation gateway as a network side destination address of the GRE tunnel.

An embodiment of the present invention provides an aggregation gateway. The aggregation gateway includes a transmitter, a receiver, a memory and a processor separately connected to the transmitter, the receiver and the memory. The memory stores program code, which when executed by the processor causes the aggregation gateway to perform the following operations:

receiving a GRE tunnel setup request sent by an access device, wherein the GRE tunnel setup request is used to request for setting up a GRE tunnel; a source address of the GRE tunnel setup request is an address of the access device, a destination address of the GRE tunnel setup request is an address of an aggregation gateway group, and the aggregation gateway belongs to the aggregation gateway group;

determining to accept the GRE tunnel setup request, obtaining the address of the access device from the GRE tunnel setup request, and configuring the address of the access device as an access side destination address of the GRE tunnel; and sending by using the address of the access device as a destination address, a GRE tunnel setup accept response in which an address of the aggregation gateway is encapsulated, wherein the GRE tunnel setup accept response is used to indicate that the access device configures the address of the aggregation gateway as a network side destination address of the GRE tunnel.

In a method for implementing a GRE tunnel, an access device, and an aggregation gateway according to the embodiments of the present invention, there is no need to separately store a peer address on the access device and the AG or each line card in the AG by performing static configuration; instead, the access device obtains, in a dynamic interaction process, an address of an AG group, then sends a GRE tunnel setup request that carries an address of the access device to the AG group, and then receives a GRE tunnel setup accept response sent back by an AG that is about to set up the GRE tunnel in the AG group, and obtains, from the GRE tunnel setup accept response, an address of the AG as a network side destination address. In this way, the GRE tunnel is dynamically established on an access network that uses an aggregation technology, and an advantage of the aggregation technology that dynamically selects the access network to make use of network resources can be brought into full play, thereby resolving a problem that the static configuration of the GRE tunnel is difficult to implement because of aggregation of a plurality of access networks in the access device or the AG.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
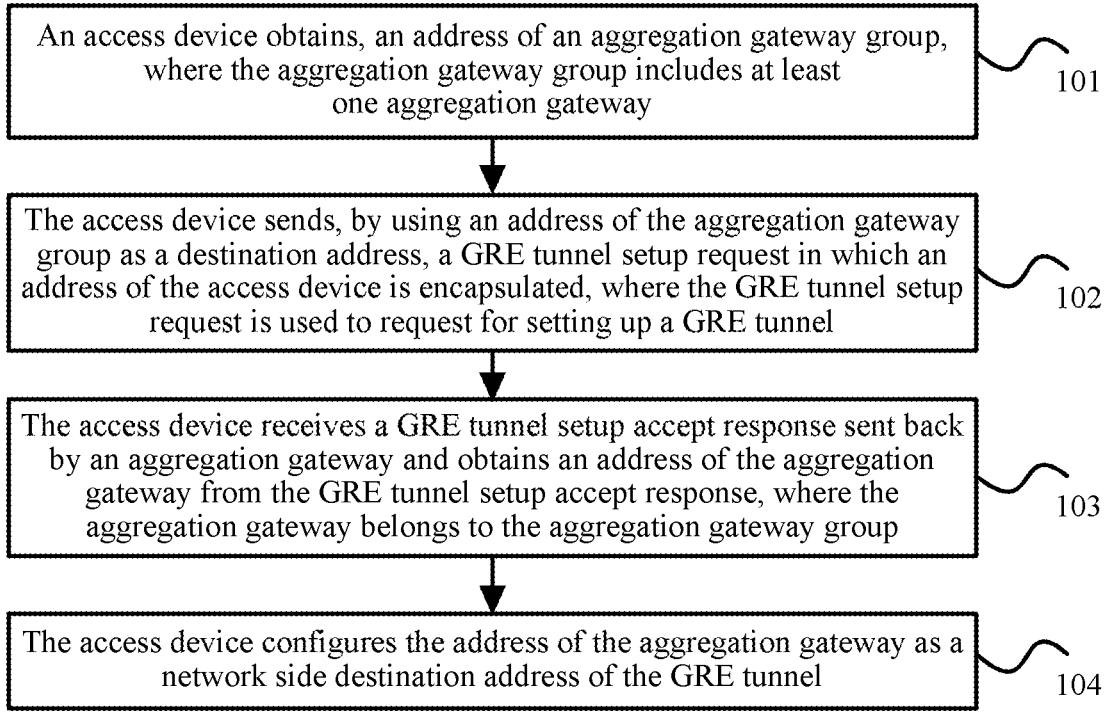
FIG. 1 is a flowchart of a method for implementing a GRE tunnel according to Embodiment 1 of the present invention.

FIG. 1 is a flowchart of a method for implementing a GRE tunnel according to Embodiment 1 of the present invention.

The method may be applicable to setting up a GRE tunnel between an access device and an AG and may be applicable to a network architecture of various access devices and AGs. Meanwhile, the method is applicable to the Internet Protocol Version 4 (Internet Protocol Version 4, IPv4 for short) and the Internet Protocol Version 6 (Internet Protocol Version 6, IPv6 for short), and is also applicable to a network on which the IPV4 and the IPV6 coexist. The method in this embodiment may be implemented by an access device on an access side, where the access device may be an access point (Access Point, AP for short), an HG, or the AG; the present invention is not limited thereto. As shown in FIG. 1, the method may be performed according to the following process:

101. The access device obtains an address of an aggregation gateway group, where the aggregation gateway group includes at least one aggregation gateway.

102. The access device sends, by using the address of the aggregation gateway group as a destination address, a GRE tunnel setup request in which an address of the access device is encapsulated, where the GRE tunnel setup request is used to request for setting up a GRE tunnel.

103. The access device receives a GRE tunnel setup accept response sent back by an aggregation gateway and obtains an address of the aggregation gateway from the GRE tunnel setup accept response, where the aggregation gateway belongs to the aggregation gateway group.

104. The access device configures the address of the aggregation gateway as a network side destination address of the GRE tunnel.

In this embodiment, there is no need to separately store a peer address on an access device and an AG or each line card in the AG by performing static configuration; instead, the access device obtains, in a dynamic interaction process, an address of an AG group, then sends a GRE tunnel setup request that carries an address of the access device to the AG group, and then receives a GRE tunnel setup accept response sent back by an AG that is about to set up the GRE tunnel in the AG group; and obtains, from the GRE tunnel setup accept response, an address of the AG as a network side destination address. In this way, the GRE tunnel is dynamically established on an access network that uses an aggregation technology, and an advantage of the aggregation technology that dynamically selects the access network to make use of network resources can be brought into full play, thereby resolving a problem that the static configuration of the GRE tunnel is difficult to implement because of aggregation of a plurality of access networks in the access device or the AG.

The following gives an detailed description with reference to a scenario of an access network:

Embodiment 2

Figure 2A:
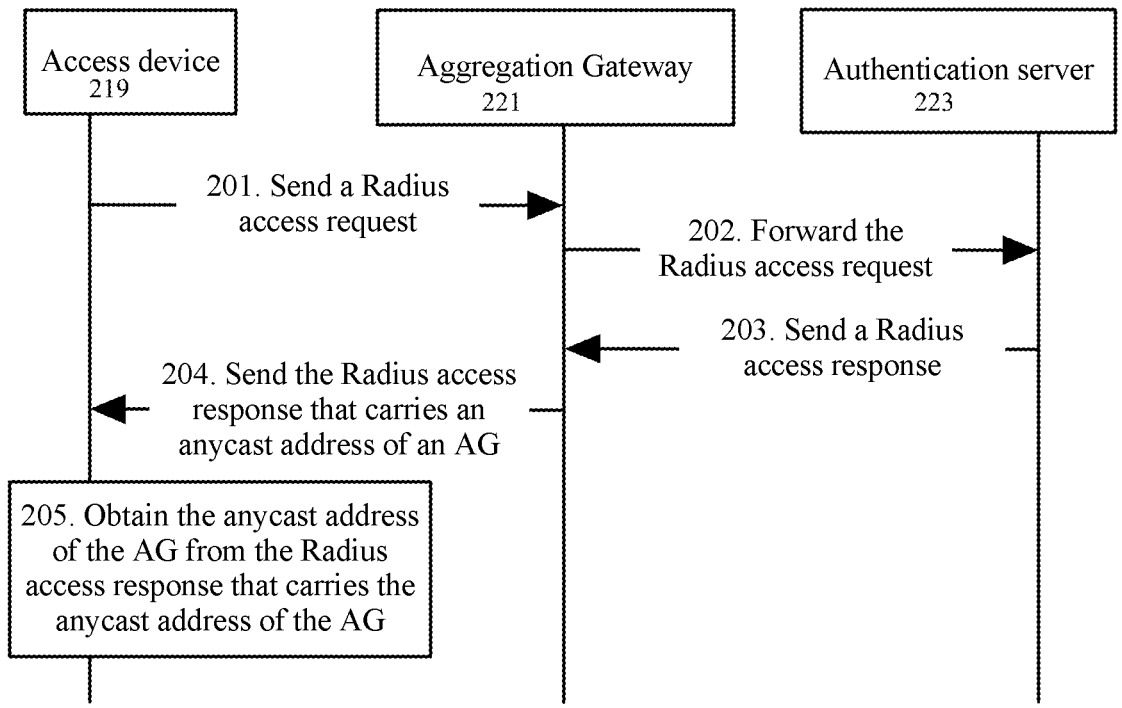
FIG. 2A is a signaling flowchart of a method for implementing a GRE tunnel according to Embodiment 2 of the present invention.
Figure 2B:
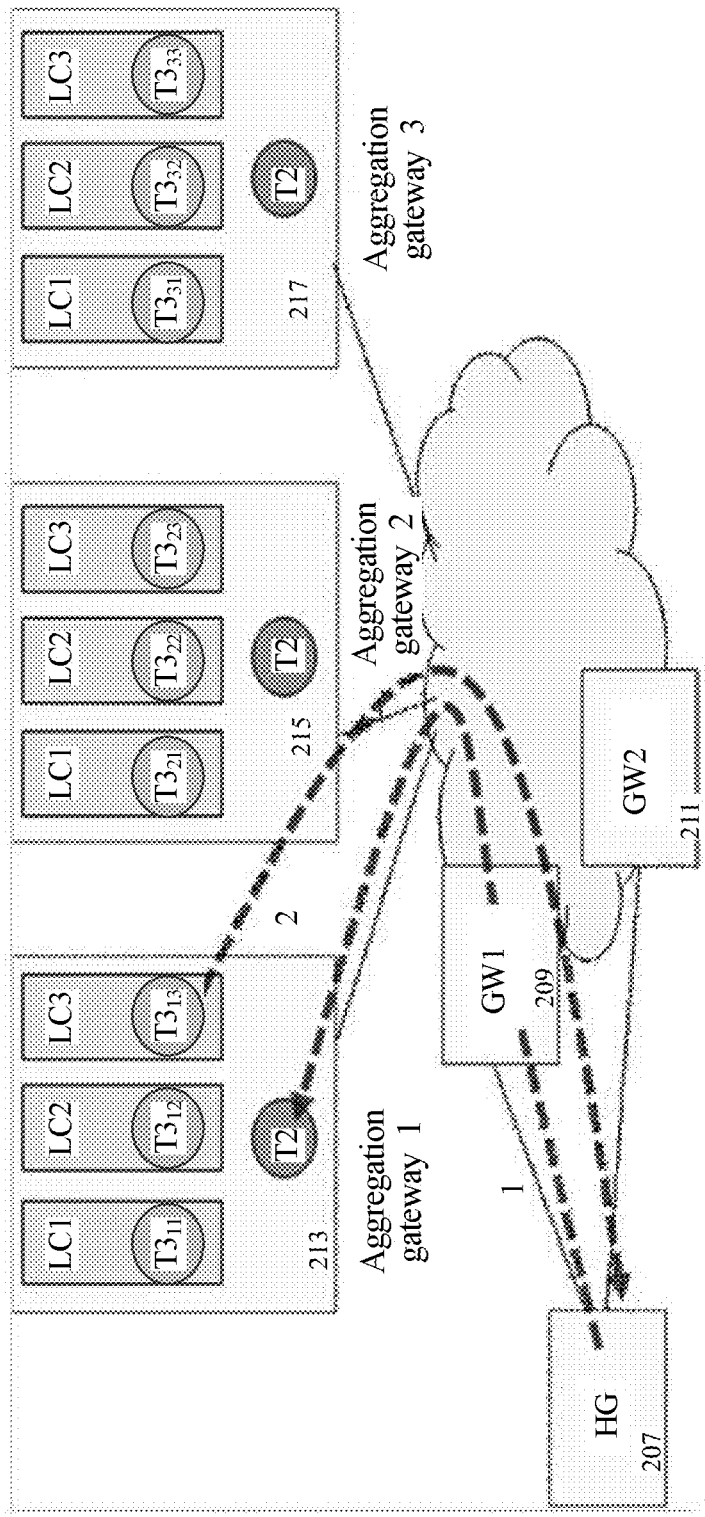
FIG. 2B is a schematic diagram of a structure of an access network to which the present invention is applicable.

FIG. 2A is a signaling flowchart of a method for implementing a GRE tunnel according to Embodiment 2 of the present invention. FIG. 2B is a schematic diagram of a structure of an access network to which the present invention is applicable. As shown in FIG. 2B, the access network is formed by an access device HG 207, gateways GW1 209 and GW2 211, and AG1 213, AG2 215, and AG3 217, where an AG group may include but is not limited to AG1 213, AG2 215, and AG3 217. The AG group may include at least one AG, and here is merely an example. Each aggregation AG may include a plurality of line card (Line Card, LC for short) addresses, that is, $T3_{11}$-$T3_{13}$ of AG1 213, $T3_{21}$-$T3_{23}$ of AG2 215 and $T3_{31}$-$T3_{33}$ of AG3 217 in the figure.

The access device may obtain an address of the aggregation gateway group by using a gateway configuration protocol according to this embodiment. A specific manner is as follows:

201. The access device 219 sends a Radius access request to the AG 221.

202. The AG 221 forwards the Radius access request to an authentication server 223.

203. The authentication server 223 sends a Radius access response to the AG 221.

204. The AG 221 sends the Radius access response that carries an anycast address of the AG 221 to the access device 219.

205. The access device 219 obtains the anycast address of the AG 221 from the Radius access response that carries the anycast address of the AG 221.

In the foregoing embodiment, the access device sends a user authentication request to the authentication server, receives the Radius access response sent back by the authentication server, and obtains the anycast address of the aggregation gateway from the Radius access response. Because the anycast address of the AG can be obtained by the access device by using the Radius access response, no extra process is required, and improvement and promotion can be easily implemented.

Optionally, the access device may also obtain the address of the aggregation gateway group by: obtaining, by the access device, a domain name of the aggregation gateway based on the gateway configuration protocol, and obtaining the anycast address of the aggregation gateway corresponding to the domain name by a domain name system (Domain Name System, DNS for short). Referring to FIG. 2B, the HG obtains the domain name of the AG based on the gateway configuration protocol such as TR069, and obtains the anycast address $T_2$ of the AG corresponding to the domain name by using the DNS.

In the foregoing manner, the anycast address of the aggregation gateway is the address of the aggregation gateway group.

Further, the address of the aggregation gateway group may further be obtained by using a Dynamic Host Configuration Protocol (Dynamic Host Configuration Protocol, DHCP for short) or based on a Point-to-Point Protocol over Ethernet (Point-to-Point Protocol Over Ethernet, PPPoE for short), or the like. The present invention imposes no limitation on a manner for obtaining the address of the aggregation gateway group.

Embodiment 3

Figure 3:
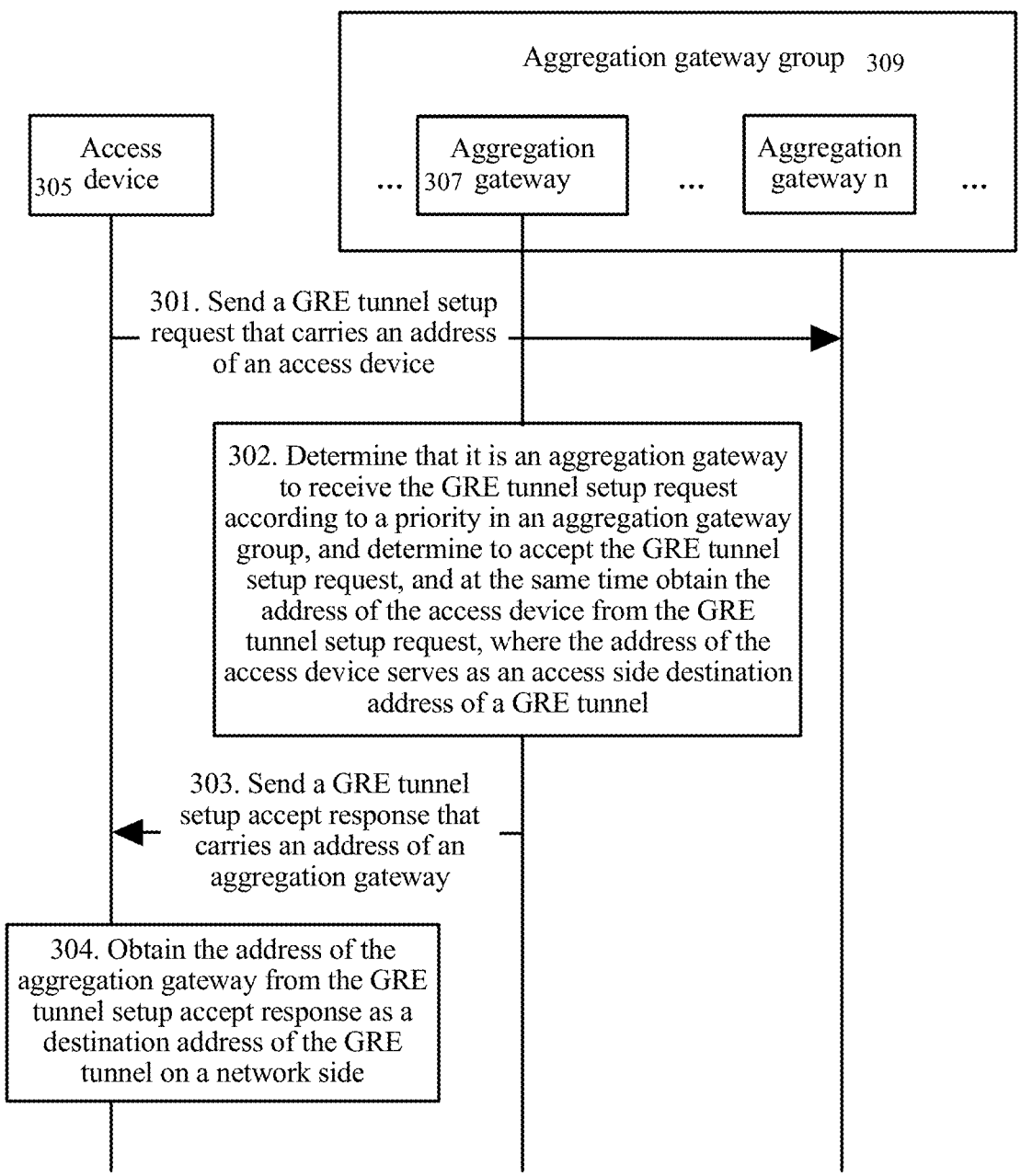
FIG. 3 is a signaling flowchart of a method for implementing a GRE tunnel according to Embodiment 3 of the present invention.

FIG. 3 is a signaling flowchart of a method for implementing a GRE tunnel according to Embodiment 3 of the present invention. As shown in FIG. 3, after an access device 305 obtains an address of an aggregation gateway group 309, the GRE tunnel may be set up according to the following process:

301. The access device 305 sends a GRE tunnel setup request that carries an address of the access device 305 to the aggregation gateway group 309.

302. An aggregation gateway 307 determines that the aggregation gateway 307 itself is an aggregation gateway to receive the GRE tunnel setup request according to a priority of the aggregation gateway group 309, and determines to accept the GRE tunnel setup request, and at the same time obtains, from the GRE tunnel setup request, the address of the access device 305, which serves as an access side destination address of a GRE tunnel.

303. The aggregation gateway 307 sends a GRE tunnel setup accept response that carries an address of the aggregation gateway 307 to the access device 305.

304. The access device obtains the address of the aggregation gateway 307 from the GRE tunnel setup accept response as a network side destination address of the GRE tunnel.

In this embodiment, the aggregation gateway has the highest priority in the aggregation gateway group. A cost value may be used as a criterion for measuring the priority. For example, an AG with the smallest cost value is the AG with the highest priority. The priority measurement criterion is not limited thereto, and here is merely an example.

Based on the foregoing embodiment, the present invention further provides a method for implementing tunnel availability maintenance, that is, after setup of the GRE tunnel is complete, the method may further include: sending, by the access device, a GRE tunnel keepalive packet to the aggregation gateway within a preset period by using the GRE tunnel. That is, the access device and the AG send the GRE tunnel keepalive packet to a peer end within the preset period, such as within a certain period of time, by using the GRE tunnel. The packet is, for example, a GRE Hello packet. If the peer end receives the packet within the preset period, it indicates that the GRE tunnel is normal.

Based on the foregoing embodiment, the present invention further provides a method for tearing down the GRE tunnel, that is, after the setup of the GRE tunnel is complete, the method further includes: receiving, by the access device, a GRE tunnel teardown packet sent by the aggregation gateway by using the GRE tunnel, or sending, by the access device, a GRE tunnel teardown packet to the aggregation gateway by using the GRE tunnel; and deleting, by the access device, the network side destination address of the GRE tunnel. That is, teardown of a tunnel may be implemented by the access device or the AG. For example, when the access device determines to tear down the GRE tunnel, the access device sends the GRE tunnel teardown packet by using the GRE tunnel; after receiving the packet, the AG deletes a locally stored access side destination address of the GRE tunnel, and the access device also deletes a locally stored network side destination address of the GRE tunnel.

Based on the foregoing embodiment, the present invention further provides a method for maintaining a GRE tunnel status, that is, after the setup of the GRE tunnel is complete, the method may further include: receiving, by the access device, a GRE tunnel notification packet sent by the aggregation gateway by using the GRE tunnel, or sending, by the access device, a GRE tunnel notification packet to the aggregation gateway by using the GRE tunnel, where the GRE tunnel notification packet is used to indicate status information of the GRE tunnel. That is, the status information of a tunnel may be sent by the access device or the AG.

In the foregoing embodiment, the GRE tunnel setup request, the GRE tunnel setup accept response, the GRE tunnel keepalive packet, the GRE tunnel teardown packet, and the GRE tunnel notification packet belong to a GRE tunnel control message, where the GRE tunnel control message includes a type field, and a value of the type field is used to indicate that the GRE tunnel control message is the GRE tunnel setup request, the GRE tunnel setup accept response, the GRE tunnel keepalive packet, the GRE tunnel teardown packet, or the GRE tunnel notification packet.

The GRE tunnel control message further includes an attribute type field and an attribute parameter field, where a value of the attribute type field is used to indicate a type of an attribute, and the attribute parameter field is used to indicate content of the attribute.

An attribute indicated by the value of the attribute type field in the GRE tunnel setup request includes: a unique user identifier or a local user identifier; an attribute indicated by the value of the attribute type field in the GRE tunnel setup accept response includes: the address of the aggregation gateway, which is a line card address of the aggregation gateway, the local user identifier, an upper limit of a tunnel delay, or a tunnel traffic check interval; an attribute indicated by the value of the attribute type field in the GRE tunnel keepalive packet includes: a transmission timestamp or a prefix of an IPv6 address of the aggregation gateway; an attribute indicated by the value of the attribute type field in the GRE tunnel notification packet includes: a status of an Internet Protocol television (Internet Protocol Television, IPTV for short) service, a bypass traffic rate, a digital subscriber line (Digital Subscriber Line, DSL for short) synchronization rate, a filter list, or a DSL tunnel switching indication.

For example, the present invention defines the following packets, which may be used as the GRE tunnel setup request, the GRE tunnel setup accept response, the GRE tunnel keepalive packet, the GRE tunnel teardown packet and the GRE tunnel notification packet, and so on. A packet format is as follows:

| 0 | | | | | | | | | | 1 | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 |
| C | R | K | S | s | Recur | | | | | Flags | | | | Ver | | Protocol Type | | | |
| | | | | | | | | Key (Session ID) | | | | | | | | | | | |
| MsgType | | | | T | Res | | | | | Attribute Type | | | | | | Data Length | | | |
| Data Value | | | | | | | | | | | | | | | | | | | |

| 2 | | | | | | | | | 3 | |
|---|---|---|---|---|---|---|---|---|---|---|
| 0 | 1 | 2 | 3 | 4 | 5 | 6 | 7 | 8 | 9 | 0 | 1 |

Protocol Type
Key (Session ID)
Data Length
Data Value

The GRE tunnel control message may be defined as follows:

| Control message type (4 bit) | Type | Sender | Receiver | Packet usage |
|---|---|---|---|---|
| GRE setup request | 1 | HG | AG | Request for setting up a tunnel |
| GRE setup accept | 2 | AG | HG | Send this message to notify an HG that a tunnel is successfully set up if a tunnel setup request is authenticated and authorized |
| GRE setup deny | 3 | AG | HG | Send this message to notify an HG that a tunnel setup request is denied if authentication and authorization of the tunnel setup request fails. |
| GRE hello | 4 | AG HG | HG AG | Tunnel keepalive packet |
| GRE tear down | 5 | HG | AG | Tunnel teardown packet |
| GRE notify | 6 | HG AG | AG HG | Timely tunnel notification packet, for example, notifying a single tunnel fault |
| Reserved | 0, 7-15 | | | |

The value of the attribute type field may be defined as follows:

| Attribute type | Value (8 bits) | Length | Carried by message | Attribute usage |
|---|---|---|---|---|
| HG MAC | 1 | 6 Byte | GRE setup request | Uniquely identifies a user |
| T3 IP address | 2 | 4 Byte | GRE setup accept | Instruct an HG to use the IP address T3 as a tunnel IP address |
| Bundle ID | 3 | 4 Byte | GRE setup accept GRE setup request | Uniquely identify a user in an AG |
| Timestamp | 4 | 4 Byte | GRE hello | Calculate a delay |
| IPTV active status | 5 | 4 Byte | GRE notify (HG->AG) | Identify a status of an IPTV service. An AG needs to deduct traffic of the IPTV from a DSL tunnel if there is the IPTV service |
| Bypass traffic rate | 6 | 4 Byte | GRE notify (HG->AG) | Bypass traffic rate. An AG needs to deduct this part of traffic from a DSL tunnel |
| DSL synchronization rate | 7 | 4 Byte | GRE notify (HG->AG) | Carry a DSL synchronization rate |
| Filter list package | 8 | Indefinitely | GRE notify (AG->HG) | Carry a filter list to indicate which traffic passes through a tunnel and which traffic does not pass through the tunnel |
| RTT threshold | 9 | 4 Byte | GRE setup accept | A delay threshold; all traffic does not pass through a tunnel when this value is exceeded |
| Bypass Bandwidth check interval | 10 | 4 Byte | GRE setup accept | Interval for checking bypass traffic |
| Switching to DSL tunnel | 11 | 2 Byte | GRE notify (HG->AG) | Instruct an AG to switch traffic only to a DSL tunnel |
| IPv6 prefix assigned by AG | 12 | 16 Byte | GRE hello (AG->HG) | Carry a prefix of an IPv6 address assigned by an AG in a Hello packet; the prefix assigned by the AG can be learned after an |

-continued

| Attribute type | Value (8 bits) | Length | Carried by message | Attribute usage |
| --- | --- | --- | --- | --- |
| | | | | intermediate lawful interception device captures the packet |
| End AVP | 255 | 1 Byte | All control message | Identify the last AVP |
| Reserved | 0, 13-255 | | | |

Embodiment 4

Figure 4:
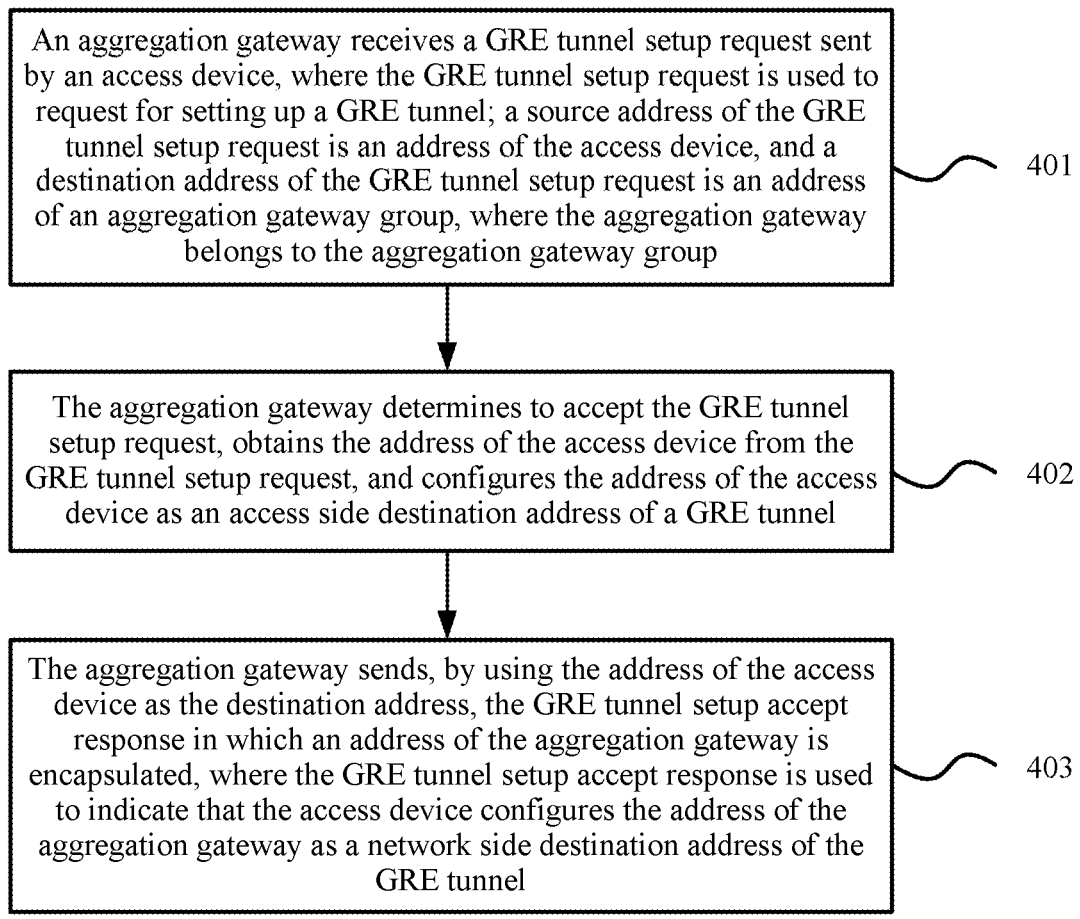
FIG. 4 is a flowchart of a method for implementing a GRE tunnel according to Embodiment 4 of the present invention.

FIG. 4 is a flowchart of a method for implementing a GRE tunnel according to Embodiment 4 of the present invention. The method may be applicable to setting up a GRE tunnel between an access device and an AG, and may be applicable to a network architecture of various access devices and AGs. Meanwhile, the method is applicable to the IPV4 and the IPV6, and is also applicable to a network on which the IPV4 and the IPV6 coexist. The method in this embodiment may be implemented by the AG on a network side. As shown in FIG. 4, the method may be performed according to the following process:

401. An aggregation gateway receives a GRE tunnel setup request sent by the access device, where the GRE tunnel setup request is used to request for setting up a GRE tunnel; a source address of the GRE tunnel setup request is an address of the access device, and a destination address of the GRE tunnel setup request is an address of an aggregation gateway group, where the aggregation gateway belongs to the aggregation gateway group.

Before this step, the method may also include: determining, by the aggregation gateway, that the aggregation gateway has the highest priority in the aggregation gateway group. A cost value may be used to measure the priority, and the cost value of the AG is implemented by configuration in an initial state. During use, the AG adjusts its cost value based on a usage of a device LC, to ensure that it has the highest priority, that is, it has the smallest cost value, so as to ensure that the AG, relative to a network side destination address of the GRE tunnel, is an AG with the highest priority in the aggregation gateway group. By using this dynamic tunnel setup manner, a GRE tunnel with a load sharing feature of a network aggregation gateway is dynamically set up.

402. The aggregation gateway determines to accept the GRE tunnel setup request, obtains the address of the access device from the GRE tunnel setup request, and configures the address of the access device as an access side destination address of the GRE tunnel.

403. The aggregation gateway sends, by using the address of the access device as a destination address, a GRE tunnel setup accept response in which an address of the aggregation gateway is encapsulated, where the GRE tunnel setup accept response is used to indicate that the access device configures the address of the aggregation gateway as a network side destination address of the GRE tunnel.

In this step, the address of the aggregation gateway may be an actual address of the aggregation gateway, or a line card address of a line card that actually works in the aggregation gateway. That is, with reference to FIG. 2B, the actual address of the AG may be an anycast address $T_2$ of the first AG 213, and the address of the LC that actually works in the first AG 213 may be, for example, $T3_{11}$ of the first AG 213.

In this embodiment, there is no need to separately store a peer address on an access device and an AG or each line card in the AG by performing static configuration; instead, in a dynamic interaction process, a first AG receives a GRE tunnel setup request that carries an address of the access device sent by the access device; the first AG receives, after determining that it is the AG with the highest priority in an AG group, the GRE tunnel setup request, and sends, after determining to accept the GRE tunnel setup request, a GRE tunnel setup accept response that carries an address of the first AG to the access device, and obtains the address of the access device from the GRE tunnel setup request, where the address of the access device serves as an access side destination address. In this way, a GRE tunnel is dynamically established on an access network that uses an aggregation technology, and an advantage of the aggregation technology that dynamically selects the access network to make use of network resources can be brought into full play, thereby resolving a problem that the static configuration of the GRE tunnel is difficult to implement because of aggregation of a plurality of access networks in the access device or the AG.

Based on the foregoing embodiment, the present invention further provides a method for implementing tunnel availability maintenance, that is, after setup of the GRE tunnel is complete, the method may further include: sending, by the aggregation gateway, a GRE tunnel keepalive packet to the access device within a preset period by using the GRE tunnel. That is, the access device and the AG send the GRE tunnel keepalive packet to a peer end within the preset period, such as within a certain period of time, by using the GRE tunnel. The packet is, for example, a GRE Hello packet. If the peer end receives the packet within the preset period, it indicates that the GRE tunnel is normal.

Based on the foregoing embodiment, the present invention further provides a method for tearing down the GRE tunnel, that is, after the setup of the GRE tunnel is complete, the method further includes: receiving, by the aggregation gateway, a GRE tunnel teardown packet sent by the access device by using the GRE tunnel, or sending, by the aggregation gateway, a GRE tunnel teardown packet to the access device by using the GRE tunnel; and deleting, by the aggregation gateway, the access side destination address of the GRE tunnel. That is, teardown of a tunnel may be implemented by the access device or the first AG. For example, when the first AG determines to tear down the GRE tunnel, the first AG sends the GRE tunnel teardown packet by using the GRE tunnel; after receiving the packet, the access device deletes a locally stored network side destination address of the GRE tunnel, and the first AG also deletes a locally stored access side destination address of the GRE tunnel.

Based on the foregoing embodiment, the present invention further provides a method for maintaining a GRE tunnel status, that is, after the setup of the GRE tunnel is complete, the method may further include: receiving, by the aggregation gateway, a GRE tunnel notification packet sent by the access device by using the GRE tunnel, or sending, by the aggregation gateway, a GRE tunnel notification packet to the access device by using the GRE tunnel, where the GRE tunnel notification packet is used to indicate status information of the GRE tunnel. That is, the status information of the tunnel may be sent by the access device or the first AG.

In the foregoing embodiment, the GRE tunnel setup request, the GRE tunnel setup accept response, the GRE tunnel keepalive packet, the GRE tunnel teardown packet, and the GRE tunnel notification packet belong to a GRE tunnel control message, where the GRE tunnel control message includes a type field, and a value of the type field is used to indicate that the GRE tunnel control message is the GRE tunnel setup request, the GRE tunnel setup accept response, the GRE tunnel keepalive packet, the GRE tunnel teardown packet, or the GRE tunnel notification packet.

The GRE tunnel control message further includes an attribute type field and an attribute parameter field, where a value of the attribute type field is used to indicate a type of an attribute, and the attribute parameter field is used to indicate content of the attribute.

An attribute indicated by the value of the attribute type field in the GRE tunnel setup request includes: a unique user identifier or a local user identifier; an attribute indicated by the value of the attribute type field in the GRE tunnel setup accept response includes: the address of the aggregation gateway, which is a line card address of the aggregation gateway, the local user identifier, an upper limit of a tunnel delay, or a tunnel traffic check interval; an attribute indicated by the value of the attribute type field in the GRE tunnel keepalive packet includes: a transmission timestamp or a prefix of an IPv6 address of the aggregation gateway; an attribute indicated by the value of the attribute type field in the GRE tunnel notification packet includes: a status of an IPTV service, a bypass traffic rate, a DSL synchronization rate, a filter list, or DSL tunnel switching indication. For a packet format of the GRE tunnel setup request, the GRE tunnel setup accept response, the GRE tunnel keepalive packet, the GRE tunnel teardown packet, and the GRE tunnel notification packet, and definitions of the GRE tunnel control message and the value of the attribute type field, refer to the format and definitions described above. Details are not described herein again.

Embodiment 5

Figure 5:
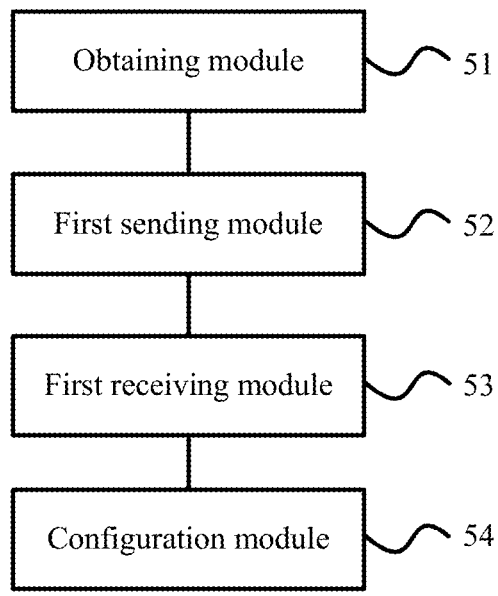
FIG. 5 is a schematic structural diagram of an access device according to Embodiment 5 of the present invention.

FIG. 5 is a schematic structural diagram of an access device according to Embodiment 5 of the present invention. As shown in FIG. 5, the access device may include: an obtaining module 51, a first sending module 52, a first receiving module 53, and a configuration module 54, where the obtaining module 51 may be configured to obtain an address of an aggregation gateway group, where the aggregation gateway group includes at least one aggregation gateway; the first sending module 52 may be configured to send, by using the address of the aggregation gateway group as a destination address, a GRE tunnel setup request in which an address of the access device is encapsulated, where the GRE tunnel setup request is used to request for setting up a GRE tunnel; the first receiving module 53 may be configured to receive a GRE tunnel setup accept response sent back by an aggregation gateway and obtain an address of the aggregation gateway from the GRE tunnel setup accept response, where the aggregation gateway belongs to the aggregation gateway group; and the configuration module 54 may be configured to configure the address of the aggregation gateway as a network side destination address of the aggregation gateway.

Optionally, the aggregation gateway has the highest priority in the aggregation gateway group.

Optionally, the obtaining module 51 may be specifically configured to: obtain a domain name of the aggregation gateway based on a gateway configuration protocol and obtain an anycast address of the aggregation gateway corresponding to the domain name by a domain name system (DNS); or send a user authentication request to an authentication server, receive a Radius access response sent back by the authentication server, and obtain an anycast address of the aggregation gateway from the Radius access response, where the anycast address of the aggregation gateway is the address of the aggregation gateway group.

Optionally, the configuration module 54 may be further configured to: send a GRE tunnel keepalive packet to the aggregation gateway within a preset period by using the GRE tunnel.

Optionally, the configuration module 54 may be further configured to: receive a GRE tunnel teardown packet sent by the aggregation gateway by using the GRE tunnel, or send a GRE tunnel teardown packet to the aggregation gateway by using the GRE tunnel, and delete the network side destination address of the GRE tunnel.

Optionally, the configuration module 54 may be further configured to: receive a GRE tunnel notification packet sent by the aggregation gateway by using the GRE tunnel, or send a GRE tunnel notification packet to the aggregation gateway by using the GRE tunnel, where the GRE tunnel notification packet is used to indicate status information of the GRE tunnel.

The device in this embodiment may be configured to execute the technical solutions in method embodiments shown in FIG. 1 to FIG. 3. For a specific function, refer to the foregoing method embodiments. Details are not described herein again.

Embodiment 6

Figure 6:
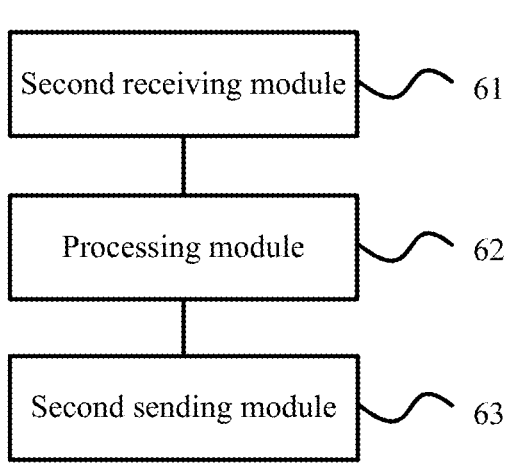
FIG. 6 is a schematic structural diagram of an aggregation gateway according to Embodiment 6 of the present invention.

FIG. 6 is a schematic structural diagram of an aggregation gateway according to Embodiment 6 of the present invention. As shown in FIG. 6, the aggregation gateway may include: a second receiving module 61, a processing module 62, and a second sending module 63. The second receiving module 61 may be configured to receive a GRE tunnel setup request sent by an access device, where the GRE tunnel setup request is used to request for setting up a GRE tunnel; a source address of the GRE tunnel setup request is an address of the access device, a destination address of the GRE tunnel setup request is an address of an aggregation gateway group, and the aggregation gateway belongs to the aggregation gateway group; the processing module 62 may be configured to determine to accept the GRE tunnel setup request, obtain the address of the access device from the GRE tunnel setup request, and configure the address of the access device as an access side destination address of the GRE tunnel; the second sending module 63 may be configured to send, by using the address of the access device as a destination address, a GRE tunnel setup accept response in which an address of the aggregation gateway is encapsulated, and the GRE tunnel setup accept response is used to indicate that the access device configures the address of the aggregation gateway as a network side destination address of the GRE tunnel.

Optionally, the second receiving module 61 may be specifically configured to: determine, before receiving the GRE tunnel setup request sent by the access device, that the aggregation gateway has the highest priority in the aggregation gateway group.

Optionally, the second sending module 63 may be specifically configured to: send a GRE tunnel keepalive packet to the access device within a preset period by using the GRE tunnel.

Optionally, the second sending module 63 may be specifically configured to: receive a GRE tunnel teardown packet sent by the access device by using the GRE tunnel, or send a GRE tunnel teardown packet to the access device by using the GRE tunnel, and delete the access side destination address of the GRE tunnel.

Optionally, the second sending module 63 may be specifically configured to: receive a GRE tunnel notification packet sent by the access device by using the GRE tunnel, or send a GRE tunnel notification packet to the access device by using the GRE tunnel, where the GRE tunnel notification packet is used to indicate status information of the GRE tunnel.

The device in this embodiment may be configured to execute the technical solution in the method embodiment shown in FIG. 4. For a specific function, refer to the foregoing method embodiment. Details are not described herein again.

Embodiment 7

Figure 7:
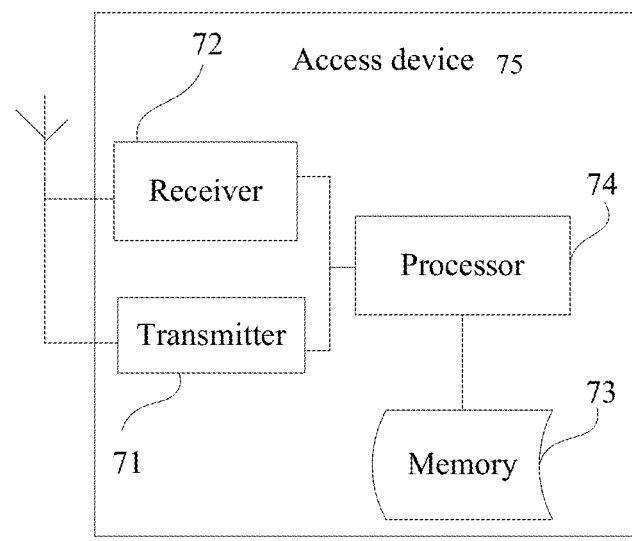
FIG. 7 is a schematic structural diagram of an access device according to Embodiment 7 of the present invention.

FIG. 7 is a schematic structural diagram of an access device according to Embodiment 7 of the present invention. As shown in FIG. 7, the access device 75 may include: a transmitter 71, a receiver 72, a memory 73, and a processor 74 separately connected to the transmitter 71, the receiver 72, and the memory 73, where the memory 73 stores a string of program code, and the processor 74 is configured to call the program code stored in the memory 73 and may execute the technical solutions in the method embodiments shown in FIG. 1 to FIG. 3. For a specific function, refer to the foregoing method embodiments. Details are not described herein again.

Embodiment 8

Figure 8:
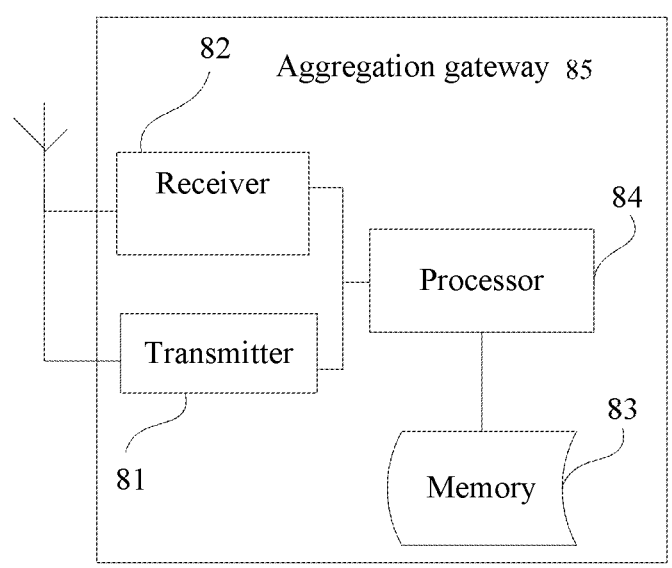
FIG. 8 is a schematic structural diagram of an aggregation gateway according to Embodiment 8 of the present invention.

FIG. 8 is a schematic structural diagram of an aggregation gateway according to Embodiment 8 of the present invention. As shown in FIG. 8, the aggregation gateway 85 may include: a transmitter 81, a receiver 82, a memory 83, and a processor 84 separately connected to the transmitter 81, the receiver 82, and the memory 83, where the memory 83 stores a string of program code, and the processor 84 is configured to call the program code stored in the memory 83 and may execute the technical solution in the method embodiment shown in FIG. 4. For a specific function, refer to the foregoing method embodiment. Details are not described herein again.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent substitutions to some or all the technical features thereof, without departing from the spirit and scope of the technical solutions of the embodiments of the present invention.

What is claimed is:

1. A home gateway comprising:
   a non-transitory computer readable medium containing computer-executable instructions; and
   a processor configured to execute the computer-executable instructions to perform operations comprising:
   establishing a digital subscriber line (DSL) generic routing encapsulation (GRE) tunnel with an aggregation gateway; and
   sending a first GRE tunnel notification packet to the aggregation gateway through the DSL GRE tunnel,
   wherein the first GRE tunnel notification packet comprises an attribute type field,
   wherein the attribute type field comprises an 8 bit value among a plurality of possible values and each value of the plurality of values corresponds to a respective attribute type,
   wherein the 8 bit value corresponds to an attribute type of switching to DSL tunnel for instructing the aggregation gateway to transmit traffic to the home gateway only through the DSL GRE tunnel,
   wherein sending the first GRE tunnel notification packet to the aggregation gateway causes the aggregation gateway to transmit traffic to the home gateway only through the DSL GRE tunnel.

2. The home gateway according to claim 1, wherein the processor is further configured to perform an operation of sending a second GRE tunnel notification packet to the aggregation gateway through the DSL GRE tunnel,
   wherein the second GRE tunnel notification packet comprises a bypass traffic rate for notifying the aggregation gateway to deduct the bypass traffic rate from available bandwidth of the DSL GRE tunnel.

3. The home gateway according to claim 1, wherein the processor is further configured to perform operations of:
   receiving a third GRE tunnel notification packet sent by the aggregation gateway through the DSL GRE tunnel,
   the third GRE tunnel notification packet comprises a filter list for indicating which traffic does not pass through the tunnel.

4. The home gateway according to claim 1,
   wherein the 8 bit value of is 11.

5. An aggregation gateway comprising:
   a non-transitory computer readable medium containing computer-executable instructions; and
   a processor configured to execute the computer-executable instructions to perform operations comprising:
   establishing a digital subscriber line (DSL) generic routing encapsulation (GRE) tunnel with a home gateway;
   receiving a first GRE tunnel notification packet through the DSL GRE tunnel,
   wherein the first GRE tunnel notification packet comprises an attribute type field,
   wherein the attribute type field comprises an 8 bit value among a plurality of possible values and each value of the plurality of values corresponds to a respective attribute type, wherein the 8 bit value corresponds to an attribute type of switching to DSL tunnel for instructing the aggregation gateway to transmit traffic to the home gateway only through the DSL GRE tunnel; and transmitting traffic to the home gateway only through the DSL GRE tunnel according to the first GRE tunnel notification packet.

6. The aggregation gateway according to claim 5, wherein the processor is further configured to perform an operation of sending a second GRE tunnel notification packet through the DSL GRE tunnel, the second GRE tunnel notification packet comprises a filter list for indicating which traffic does not pass through the tunnel.

7. The aggregation gateway according to claim 5, wherein the processor is further configured to perform an operation of sending a GRE hello packet through the DSL GRE tunnel, wherein the GRE hello packet comprises an IPv6 prefix assigned by the aggregation gateway.

8. The aggregation gateway according to claim 5, wherein the 8 bit value is 11.

9. A method performed by a home gateway for communicating with an aggregation gateway, comprising:

establishing a digital subscriber line (DSL) generic routing encapsulation (GRE) tunnel with the aggregation gateway; and sending a first GRE tunnel notification packet to the aggregation gateway through the DSL GRE tunnel, wherein the first GRE tunnel notification packet comprises an attribute type field, wherein the attribute type field comprises an 8 bit value among a plurality of possible values and each value of the plurality of values corresponds to a respective attribute type, wherein the 8 bit value corresponds to an attribute type of switching to DSL tunnel for instructing the aggregation gateway to transmit traffic to the home gateway only through the DSL GRE tunnel, wherein sending the first GRE tunnel notification packet to the aggregation gateway causes the aggregation gateway to transmit traffic to the home gateway only through the DSL GRE tunnel.

10. The method according to claim 9, wherein the 8 bit value is 11.

11. A method performed by an aggregation gateway for communicating with a home gateway, comprising:

establishing a digital subscriber line (DSL) generic routing encapsulation (GRE) tunnel with the home gateway;

receiving a first GRE tunnel notification packet through the DSL GRE tunnel, wherein the first GRE tunnel notification packet comprises an attribute type field, wherein the attribute type field comprises an 8 bit value among a plurality of possible values and each value of the plurality of values corresponds to a respective attribute type, wherein the 8 bit value corresponds to an attribute type of switching to DSL tunnel for instructing the aggregation gateway to transmit traffic to the home gateway only through the DSL GRE tunnel and transmitting traffic to the home gateway only through the DSL GRE tunnel according to the first GRE tunnel notification packet.

12. The method according to claim 11, wherein the 8 bit value is 11.

* * * * *